No. 662,594. Patented Nov. 27, 1900.
W. ESTY.
WHEEL.
(Application filed Oct. 31, 1899.)
(No Model.)
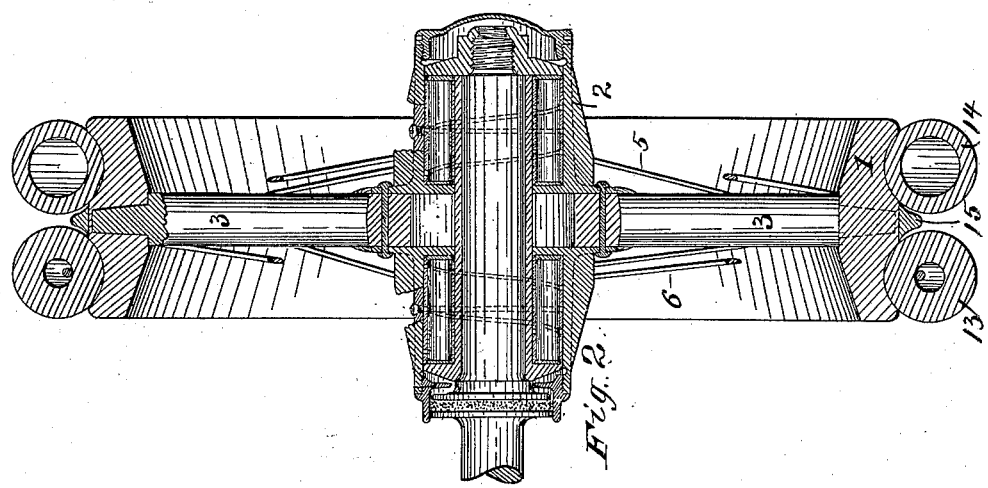
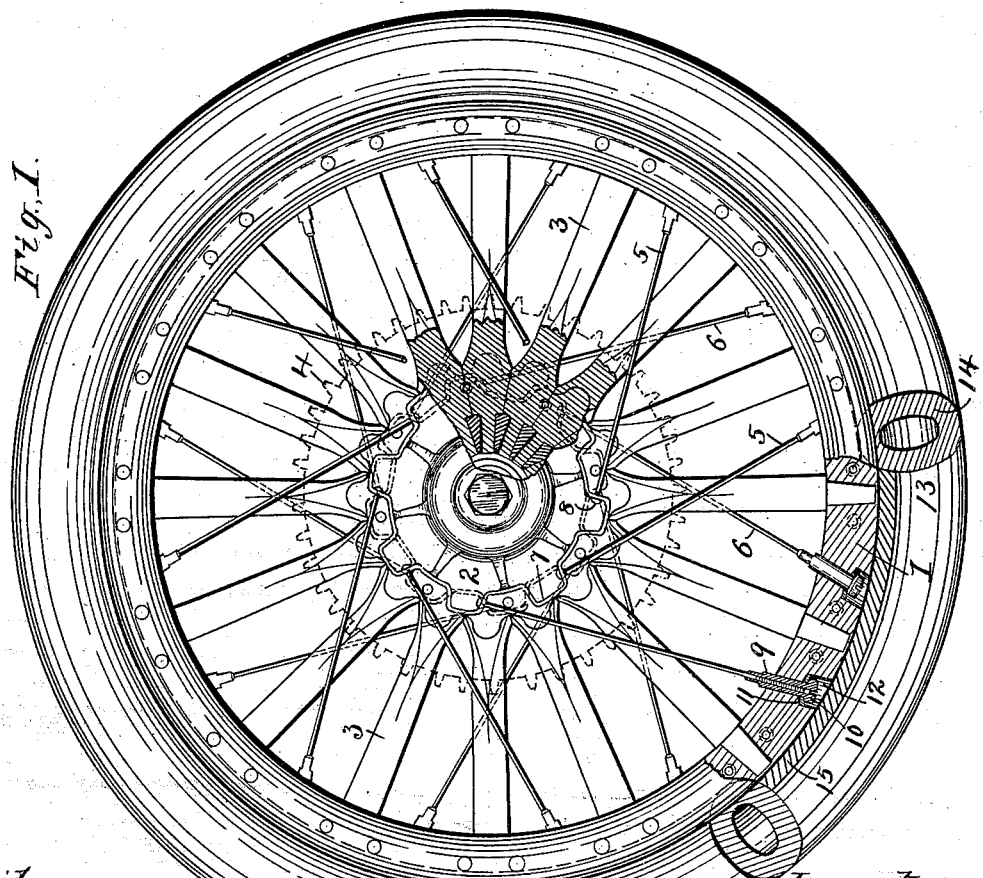
Witnesses.
W. Rees Edelin.
H. B. Kerkam.
Inventor
William Esty
by Arthur F. Browne
his Attorney

UNITED STATES PATENT OFFICE.

WILLIAM ESTY, OF LACONIA, NEW HAMPSHIRE.

WHEEL.

SPECIFICATION forming part of Letters Patent No. 662,594, dated November 27, 1900.

Application filed October 31, 1899. Serial No. 735,417. (No model.)

*To all whom it may concern:*

Be it known that I, WILLIAM ESTY, of Laconia, in the county of Belknap and State of New Hampshire, have invented certain new and useful Improvements in Wheels, of which the following is a specification.

This invention relates more especially to wheels which are intended to be used on motor-vehicles, (now popularly known as "automobiles,") and particularly to the traction-wheels of such self-propelled vehicles. The wheels of self-propelled vehicles of this character are necessarily obliged to sustain and carry a considerable load, not only performing the office of sustaining the weight of the vehicle itself and the occupants, but also of the motor and power-generating material. It is hence essential that the wheels should be strong and capable of upholding the necessary weight. In order to be sufficiently strong, it is essential that such wheels should have radial spokes, such as are ordinarily employed in vehicles, since such spokes are ample to sustain the weight and at the same time render the wheels themselves light. Experience demonstrates, however, that while wheels with such radial spokes are sufficiently strong to sustain the necessary weight they are ineffective to withstand the torsional strain due to the application of the driving force when such wheels are used as traction-wheels. In whatever way the power is applied on a self-propelled vehicle to the traction-wheels there is always involved a strain which is at right angles to the length of the spokes, and while such radial spokes are effective to withstand a longitudinal strain, such as they are subjected to by the weight of the vehicle, they are ineffective to withstant a lateral strain, such as is placed upon them by the driving force. The result is that if an ordinary wheel with radial spokes is used as the traction-wheel of a self-propelled vehicle the driving strain twists the traction-wheel out of shape and renders it useless in a short time.

The primary object of the present invention is to overcome the injurious effects of this torsional strain upon the traction-wheels while at the same time retaining the load-sustaining strength of such wheels due to the employment of radial spokes. To this end, in accordance with the present invention, the traction-wheels of such self-propelled vehicles are provided with tangential spokes in addition to radial spokes, and preferably these tangential spokes are arranged so as to extend in opposite directions from the hubs of the wheels. Each of these tangential torsion-resisting spokes is secured at its outer end to the felly of the wheel and at its inner end to the hub at a substantial distance along the radius from the axis of the wheel, being at this point perpendicular to such radius, and hence tangential to a circle of which said distance is the radius and parallel to a tangent of the circle described by the driving force. In such self-propelled vehicles the driving force is applied to the wheel either through a crank on the axle or through a gear-wheel carried by the axle or wheel-hub, and in the case of the crank it describes a circle to tangents, of which the torsion-resisting spokes are parallel, and in case the power is applied through a force-transmitting gear on the axle or hub the torsion-resisting spokes are parallel to tangents of the pitch-line of the gear. Hence such tangential torsion-resisting spokes, supplemental to the radial load-sustaining spokes, render the traction-wheels of self-propelled vehicles firm against the injurious torsional effect of the applied driving force, and therefore such traction-wheels are durable and efficient. Traction-wheels so constructed are preferably keyed or otherwise rigidly secured to opposite ends of the driving-axle to which the driving force is applied. Also, preferably, the radial load-sustaining spokes are made of wood and the tangential torsion-resisting spokes are made of metal and may or may not be strained so as to act as tension-spokes.

In self-propelled vehicles I preferably employ wheels, as above described, throughout the vehicle, whether traction-wheels or simply load-sustaining wheels. In case the wheels are not traction-wheels they turn upon their axle.

In order that the present improvements may be clearly understood, one embodiment of the same is illustrated in the accompanying drawings, in which—

Figure 1 is a side view of one of the improved traction-wheels, parts being shown in section to facilitate the illustration of the construction. Fig. 2 is a section of the improved construction of the wheel, showing it when used not as a traction-wheel.

1 is the felly.

2 is the hub.

3 3 are the radial load-sustaining spokes, which are shown as connected in a manner common where wooden radial spokes are employed.

Fig. 1 illustrates a transmitting gear-wheel 4, which is fast to the axle, the traction-wheel being also fast to the axle, through which gear-wheel the driving force is transmitted to the wheel.

5 5 and 6 6 are the two sets of tangential torsion-resisting spokes, one set 5 5 being secured to the hub at one side of the radial spokes, while the other set 6 6 is secured to the hub on the other side of the radial spokes and extends from the hub to the felly in the opposite direction to which the first set 5 5 extends. As a consequence of this arrangement of the tangential spokes one set resists the thrust and the other set the pull of the driving force, irrespective of the direction in which the wheel is rotated. The tangential spokes are shown as being made of metal, and there are as many of the tangential spokes as there are of the radial spokes, each tangential spoke being secured to the felly between two radial spokes. Each tangential spoke extends through an aperture in a suitably-shaped flange 7 on the wheel-hub and has an enlarged head 8 to bear against said flange. Each spoke at its outer end is screw-threaded and screws into a metallic socket 9, which extends through the felly and has an enlarged nicked head 10, which seats against a washer 11, which is located in an enlarged recess 12, formed in the outer periphery of the felly. By screwing upon the socket 9 the tangential spokes can be rendered rigid and tension can be applied to them, if desired.

13 and 14 are two parallel elastic tires, one of which, 13, is shown as a cushion tire, and the other, 14, is shown as a pneumatic tire, to indicate that either pneumatic or cushion tires, or both, may be used.

15 is a triangular-shaped metal tire located between the two elastic tires and serving by its shape to assist in retaining the two elastic tires in place.

The improved wheel is in substance an ordinary vehicle-wheel having load-sustaining spokes, to which are added tangential torsion-resisting spokes. The radial spokes receive the thrust due to the weight of the vehicle and transmit the same downwardly from the hub to the felly, and are hence to be distinguished from wire tension-spokes, such as are employed in bicycles and other light-wheeled structures which do not have to sustain heavy loads, such tension-spokes being insufficient to sustain the heavy load, such as is characteristic of self-propelled vehicles or automobiles.

I claim as my invention—

1. A wheel having thrust receiving and transmitting radial load-sustaining spokes and tangential torsion-resisting spokes, both of said sets of spokes rigidly connecting the hub and felly of the wheel, substantially as set forth.

2. A wheel having wooden thrust receiving and transmitting radial load-sustaining spokes and metal tangential torsion-resisting spokes, both of said sets of spokes rigidly connecting the hub and felly of the wheel, substantially as set forth.

3. A wheel having thrust receiving and transmitting radial load-sustaining spokes and two sets of tangential torsion-resisting spokes, said two sets extending from the hub to the felly of the wheel in opposite directions, and all of said spokes rigidly connecting the hub and felly of the wheel, substantially as set forth.

In witness whereof I have hereunto signed my name in the presence of two subscribing witnesses.

WILLIAM ESTY.

Witnesses:
GEORGE W. SHERWELL,
CHAS. V. LINDBLAD.